(12) United States Patent
Lim

(10) Patent No.: US 12,634,599 B2
(45) Date of Patent: May 19, 2026

(54) OPTICAL NAVIGATION DEVICE AND METHOD CAPABLE OF MITIGATING FIXED PATTERN NOISE AND TEMPORAL NOISE TO IMPROVE TRACKING PERFORMANCE

(71) Applicant: PixArt Imaging Inc., Hsin-Chu City (TW)

(72) Inventor: Kevin Len-Li Lim, Penang (MY)

(73) Assignee: PixArt Imaging Inc., Hsin-Chu City (TW)

( * ) Notice: Subject to any disclaimer, the term of this patent is extended or adjusted under 35 U.S.C. 154(b) by 39 days.

(21) Appl. No.: 18/784,979

(22) Filed: Jul. 26, 2024

(65) Prior Publication Data

US 2026/0032357 A1     Jan. 29, 2026

(51) Int. Cl.
*H04N 25/67* (2023.01)

(52) U.S. Cl.
CPC ................................. *H04N 25/67* (2023.01)

(58) Field of Classification Search
CPC ....... H04N 25/67; G06T 7/262; G06F 3/0304; G06V 30/142; G06V 10/89
See application file for complete search history.

(56) References Cited

U.S. PATENT DOCUMENTS

| | | | | |
|---|---|---|---|---|
| 8,144,931 | B1 * | 3/2012 | Hartman ................ | G06V 10/89 |
| | | | | 348/169 |
| 2002/0118862 | A1 * | 8/2002 | Sugimoto ........ | G08B 13/19602 |
| | | | | 375/E7.263 |
| 2004/0081239 | A1 * | 4/2004 | Patti ....................... | H04N 19/82 |
| | | | | 375/E7.1 |
| 2004/0179594 | A1 * | 9/2004 | Biswas ................... | G06T 7/262 |
| | | | | 375/E7.114 |
| 2007/0273653 | A1 * | 11/2007 | Chen ..................... | G06F 3/1415 |
| | | | | 345/166 |

* cited by examiner

*Primary Examiner* — Hung H Lam
(74) *Attorney, Agent, or Firm* — Winston Hsu

(57)     ABSTRACT

A method of an optical navigation device to be coupled to a host device includes: providing a pixel array circuit to capture and generate an image frame; performing a bandpass filter operation upon the image frame to remove a low-frequency image noise and a high-frequency image noise from the image frame so as to generate a bandpass-filtered image frame; and performing a correlation operation upon the bandpass-filtered image frame and a reference image frame to generate a displacement result between the bandpass-filtered image frame and the reference image frame as a motion result of the optical navigation device; the displacement result is to be reported to the host device if the displacement result indicates a motion.

18 Claims, 8 Drawing Sheets

Cross-correlation result

Pixel difference

Cross-correlation result

Pixel difference

Cross-correlation result

Pixel difference

OPTICAL NAVIGATION DEVICE AND METHOD CAPABLE OF MITIGATING FIXED PATTERN NOISE AND TEMPORAL NOISE TO IMPROVE TRACKING PERFORMANCE

BACKGROUND OF THE INVENTION

1. Field of the Invention

The invention relates to an optical navigation mechanism, and more particularly to an optical navigation device and a corresponding method.

2. Description of the Prior Art

Generally speaking, a conventional optical sensor device may directly correlate pairs of captured images to calculate a relative displacement between the images as a motion result of pixel images of the images. However, the conventional optical sensor device will operate incorrectly if some noise occurs and overwhelms the image features of the images.

SUMMARY OF THE INVENTION

Therefore one of the objectives of the invention is to provide an optical navigation device and a corresponding method, to solve the above-mentioned problems.

According to embodiments of the invention, an optical navigation device is disclosed. The optical navigation device is coupled to a host device and comprises a pixel array circuit, an image bandpass filter circuit, and a correlation circuit. The pixel array circuit is used for capturing and generating an image frame. The image bandpass filter circuit is coupled to the pixel array circuit and used for performing a bandpass filter operation upon the image frame to remove a low-frequency image noise and a high-frequency image noise from the image frame so as to generate a bandpass-filtered image frame. The correlation circuit is coupled to the image bandpass filter circuit and used for performing a correlation operation upon the bandpass-filtered image frame and a reference image frame to generate a displacement result between the bandpass-filtered image frame and the reference image frame as a motion result of the optical navigation device; the displacement result is to be reported to the host device if the displacement result indicates a motion.

According to the embodiments, a method of an optical navigation device to be coupled to a host device is disclosed. The method comprises: providing a pixel array circuit to capture and generate an image frame; performing a bandpass filter operation upon the image frame to remove a low-frequency image noise and a high-frequency image noise from the image frame so as to generate a bandpass-filtered image frame; and performing a correlation operation upon the bandpass-filtered image frame and a reference image frame to generate a displacement result between the bandpass-filtered image frame and the reference image frame as a motion result of the optical navigation device; the displacement result is to be reported to the host device if the displacement result indicates a motion.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of an optical mouse sensor and corresponding method for correlating pairs of images to calculate a relative displacement between those images. The accuracy of the calculated relative displacement depends on quality of correlation operation. The provided technical solution is capable of mitigating both fixed pattern noise and temporal noise so as to avoid degradation of the quality of the correlation operation. In addition, the provided technical solution can remove local means and enhance edges of images.

Figure 1:
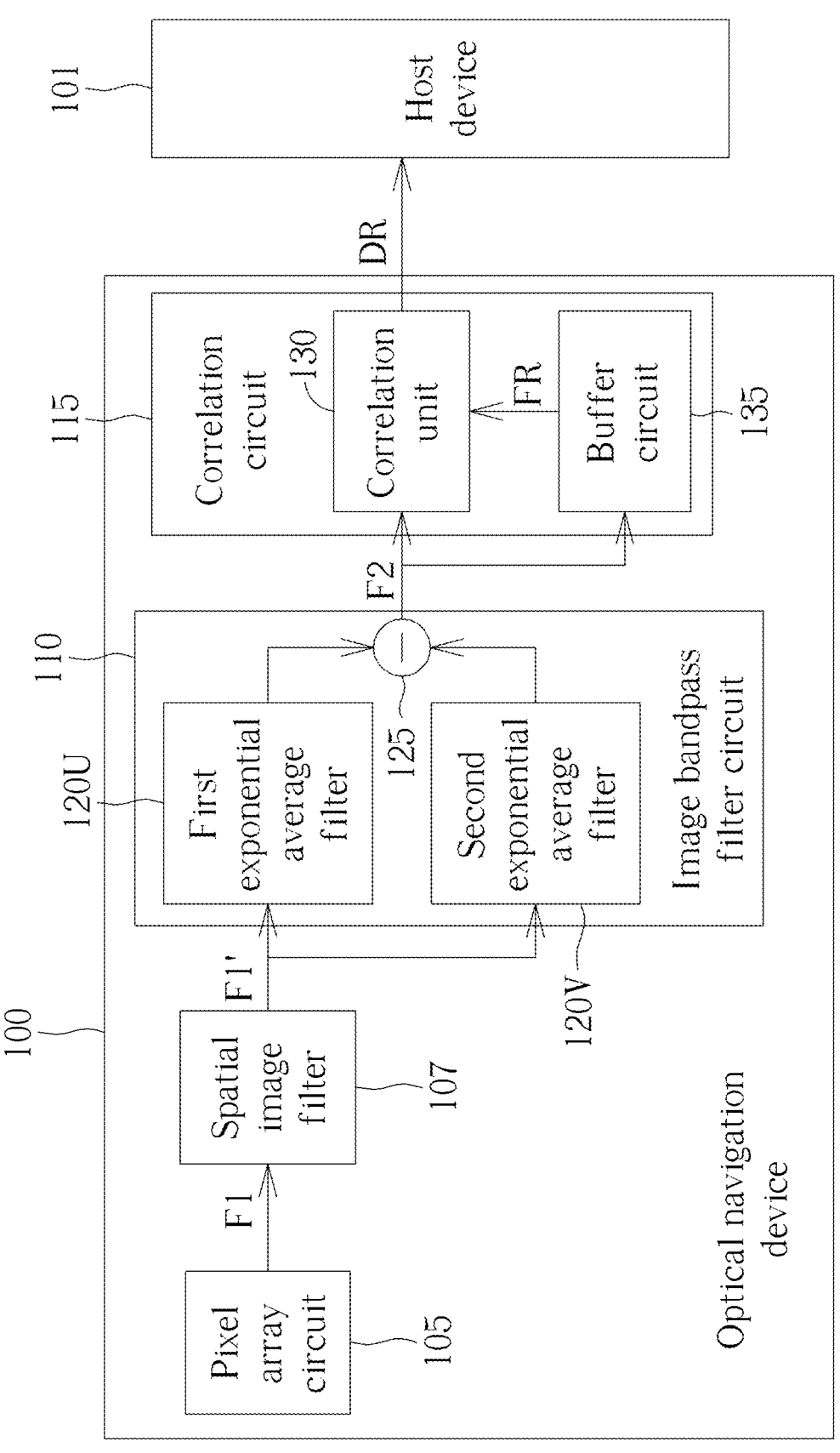
FIG. 1 is a diagram of an optical navigation device according to an embodiment of the invention.

FIG. 1 is a diagram of an optical navigation device 100 such as an optical mouse sensor device (but not limited) according to an embodiment of the invention. The optical navigation device 100 is coupled to a host device 101 and comprises a pixel array circuit 105, a spatial image filter 107, an image bandpass filter circuit 110, and a correlation circuit 115. The pixel array circuit 105 is used for capturing and generating an image frame F1. The pixel array circuit 105 may have N×M pixel units, e.g. N rows and M columns, and the generated image frame F1 for example may have N×M pixels (or called as pixel images).

The spatial image filter 107 is coupled between the pixel array circuit 105 and the image bandpass filter circuit 110, and it is used for convolving a filter matrix (e.g. a filter kernel such as a 3×3, 4×4, 5×5 or other matrix for an optical mouse sensor) with the image frame F1 captured by the pixel array circuit 105 to remove a local mean from the image frame F1 and enhance an edge of the image frame F1 to generate a spatial-filtered image F1' into the image bandpass filter circuit 110, so as to make the image bandpass filter circuit 110 perform the bandpass filter operation upon the spatial-filtered image frame F1'.

In this embodiment, the image bandpass filter circuit 110 is coupled between the spatial image filter 107 and the correlation circuit 115, and it is used for performing a bandpass filter operation upon the spatial-filtered image frame F1' to remove a low-frequency image noise and a high-frequency image noise from the spatial-filtered image frame F1' so as to generate a bandpass-filtered image frame F2. In one embodiment, the bandpass filter operation can be implemented by using multiple exponential average operations such as two exponential average operations. For example, the image bandpass filter circuit may comprise (but not limited to) a first exponential average filter 120U, a second exponential average filter 120V, and a difference circuit 125. The spatial-filtered image frame F1' is transmitted to both the first and second exponential average filters 120U and 120V.

The first exponential average filter 120U is used for performing a first exponential average operation upon the received image frame (i.e. the spatial-filtered image frame F1') by using a first average factor to generate a first exponential-average output; the first exponential average operation will be performed upon the image frame F1 if the operation of spatial image filter 107 is skipped. The second exponential average filter 120V is used for performing a second exponential average operation upon the received image frame (i.e. the spatial-filtered image frame F1') by using a second average factor which is smaller than the first average factor to generate a second exponential-average output; the second exponential average operation will be performed upon the image frame F1 if the operation of spatial image filter 107 is skipped. The difference circuit 125 is coupled to both the first exponential average filter 120U and second exponential average filter 120V, and it is used for subtracting the second exponential-average output from the first exponential-average output to generate a difference output image as the bandpass-filtered image frame F2 which is to be outputted to the correlation circuit 115.

The correlation circuit 115 is coupled to the image bandpass filter circuit 110 and used for performing a correlation operation (e.g. cross-correlation operation) upon pairs of the received image frames (e.g. the bandpass-filtered image frame F2 and a reference image frame FR) to generate a displacement result DR between the bandpass-filtered image frame F2 and the reference image frame FR as a motion result of the optical navigation device 100. The displacement result DR is to be reported to the host device 101 if the displacement result DR indicates a motion; however, this is not meant to be a limitation. In one embodiment (but not limited), the correlation circuit 115 comprises a correlation unit 130 and a buffer circuit 135. The buffer circuit 135 is used to buffer and delay the bandpass-filtered image frame F2 for one or more time slots/indices to generate and output the reference image frame FR. For example, the reference image frame FR may be a specific bandpass-filtered image frame in the past such as a previous bandpass-filtered image frame (but not limited), and the correlation unit 130 performs the correlation operation upon the current bandpass-filtered image frame F2 and the previous bandpass-filtered image frame (i.e. the reference image frame FR) to generate the displacement result DR (i.e. a relative displacement between multiple or pairs of bandpass-filtered image frames). The correlation unit 130 may perform the correlation operation upon the pairs of the received bandpass-filtered image frames at different time slots/indices which are not adjacent. This example also falls within the scope of the invention.

In practice, for generating one pixel image or each pixel image in a bandpass-filtered image frame F2, the first exponential-average output and the second exponential-average output are generated based on two following equations:

$$U_t(x) = k_u \times P_t(x) + (1 - k_u) \times U_{t-1}(x); \text{ and}$$

$$V_t(x) = k_v \times P_t(x) + (1 - k_v) \times V_{t-1}(x);$$

wherein $k_u$ is the first average factor ranging from zero to 1 for the first exponential-average operation; $k_v$ is the second average factor ranging from zero to 1 for the second exponential-average operation and smaller than the first average factor, and $k_u$ is for example ½ and $k_v$ is ¹⁄₁₆ (but not limited); $P_t(x)$ is a pixel value/image of a corresponding pixel unit x in the image frame (e.g. the frame F1') at a time index t; $U_t(x)$ is the first exponential-average output corresponding to the pixel unit x in the image frame F1' at the time index t; $U_{t-1}(x)$ is a previous first exponential-average output corresponding to the pixel unit x in a previous image frame (e.g. a previous spatial-filtered image frame) at the time index t−1; $V_t(x)$ is the second exponential-average output corresponding to the pixel unit x in the image frame at the time index t; $V_{t-1}(x)$ is another second exponential-average output corresponding to the pixel unit x in the previous image frame at the time index t−1. The bandpass filter operation is performed for most pixel images or for each pixel image to generate the first and second exponential-average outputs for the each pixel unit in the image frame.

In addition, the difference output image is generated based a following equation:

$$D_t(x) = U_t(x) - V_t(x);$$

wherein $D_t(x)$ is a difference between the first exponential-average output $U_t(x)$ corresponding to the pixel unit x in the image frame F1' at the time index t and the second exponential-average output $V_t(x)$ corresponding to the pixel unit x in the image frame F1' at the time index t.

The correlation circuit 115 is used to correlate the currently received difference output image F2 with the reference image frame FR to generate the displacement result DR, and the reference image frame FR may be another difference output image which is generated from the difference circuit 125 and associated with a previous image frame captured by the pixel array circuit 105.

By doing so, the image bandpass filter circuit 110 can effectively remove the low-frequency noise (e.g. fixed pattern noise (FPN)) and high-frequency noise (e.g. temporal noise) so as to effectively improve the accuracy of displacement results. It should be noted that it is important to reduce/remove the fixed pattern noise since the fixed pattern noise of an image does not change over displacement. If the fixed pattern noise overwhelms image features that do change over displacements, then the subsequent correlation operation will incorrectly determine that the displacements are very small or even zero. Therefore, the image bandpass filter circuit 110 is provided and used for removing the fixed pattern noise prior to the correlation operation to significantly improve the ability of the correlation operation as well as to accurately calculate displacements. Further, it should be noted that the spatial image filter 107 is used to remove the local means (over a neighborhood of pixels) but not to remove the fixed pattern noise since the support size of the kernel of spatial image filter 107 is usually small relative to the size of the fixed pattern noise.

To simply describing the operation of removing low-frequency noise, a pixel unit's signal (i.e. pixel images over time) may have the DC component (i.e. a non-varying part over time), the AC component (i.e. a varying part over time), and the fixed pattern noise. The two exponential average filters 120U, 120V, and the difference circuit 125 can operate together to remove the DC component and fixed pattern noise from the pixel unit's signal to obtain and track the AC component so as to accurately calculate the displacement. In addition, the above-mentioned operations can remove/reduce the high-frequency noise such as temporal noise.

Figure 2:
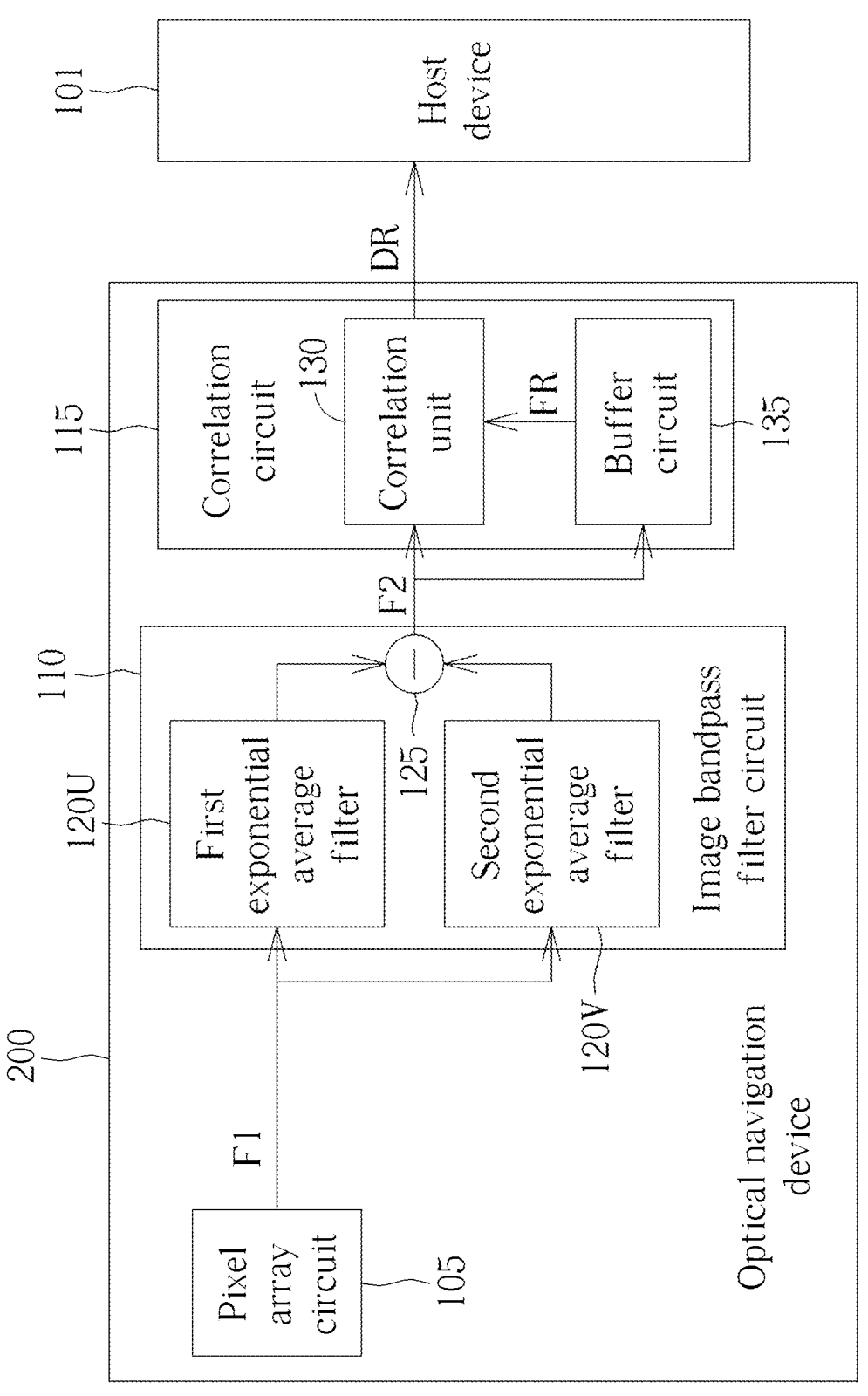
FIG. 2 is a diagram of an optical navigation device according to another embodiment of the invention.

In another embodiment, the spatial image filter 107 may be optional. FIG. 2 is a diagram of an optical navigation device 200 according to another embodiment of the invention. The difference between the embodiments of FIG. 1 and FIG. 2 is that the spatial image filter 107 is excluded by the optical navigation device 200, and thus circuit elements of the image bandpass filter circuit 110 operate based on the image frame F1 rather than the spatial-filtered image frame F1'. The functions and operations of the circuit elements having identical numbers in FIG. 2 are identical or similar to those in FIG. 1, and are not detailed again for brevity.

Figure 3:
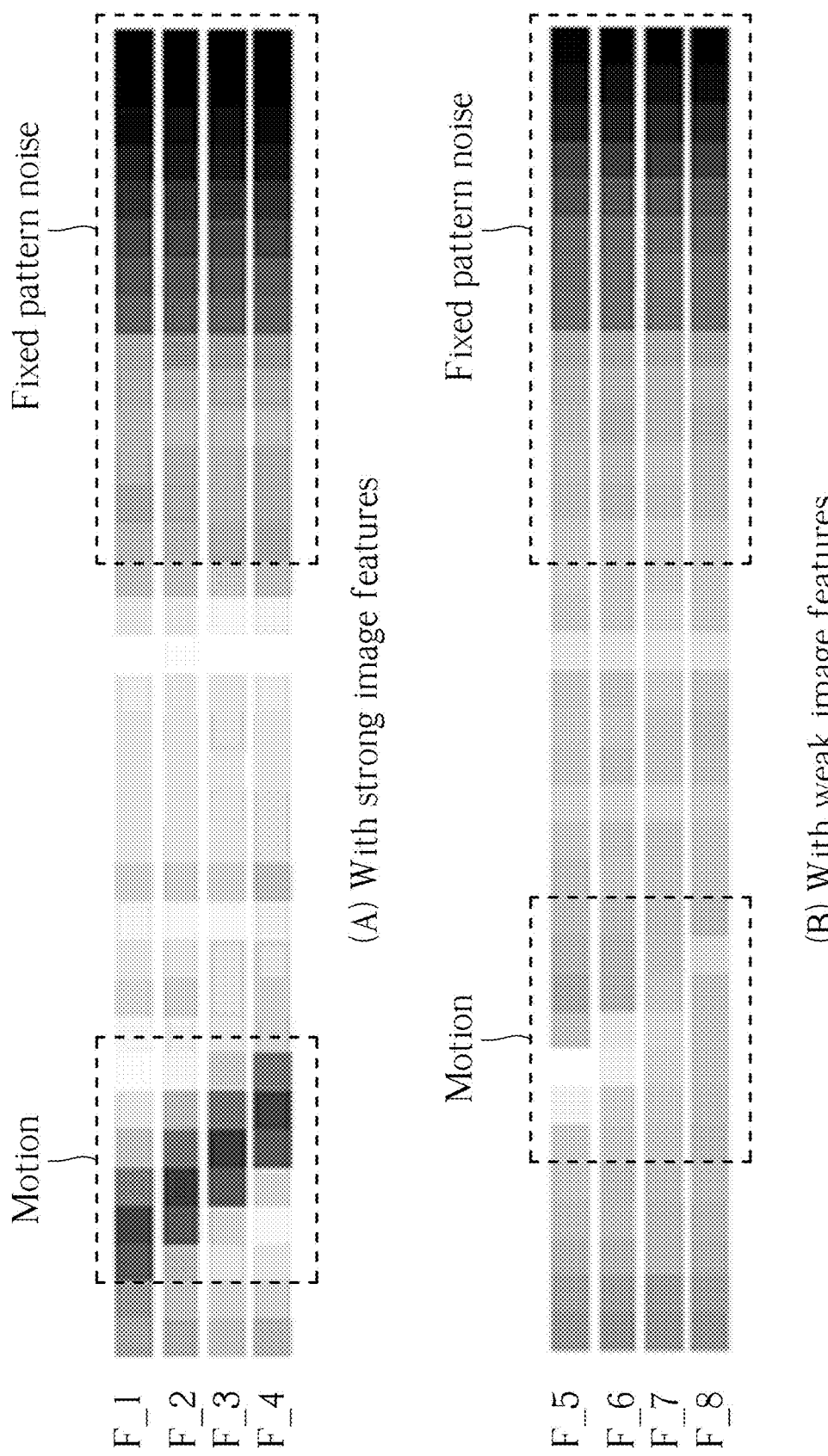
FIG. 3 is a diagram showing examples of image frames with strong image features and weak image features according to an embodiment of the invention.

In the following paragraphs, the performance comparison between different methods is provided. FIG. 3 is a diagram showing examples of image frames respectively having strong image features and weak image features according to an embodiment of the invention. To make readers more clearly and easily understand the invention as well as simplify the description, for example (but not limited), the pixel array circuit 105 may generate one-dimensional image frame such as an image frame F_1 having pixels arranged in one row and multiple columns as shown in FIG. 3, and the spatial image filter 107 skips its operation, i.e. directly using providing the image frame F_1 for the image bandpass filter circuit 110. As shown in the portion (A) of FIG. 3, for example, the raw image frames F_1, F_2, F_3, and F_4, sequentially generated from the pixel array circuit 105, may have the fixed pattern noise and strong image features which indicate the motion from the left to the right. As shown in the portion (B) of FIG. 3, for example, the image frames F_5, F_6, F_7, and F_8, sequentially generated from the pixel array circuit 105, may have the fixed pattern noise and the weak image features which also indicate the motion from the left to the right.

Figure 4:
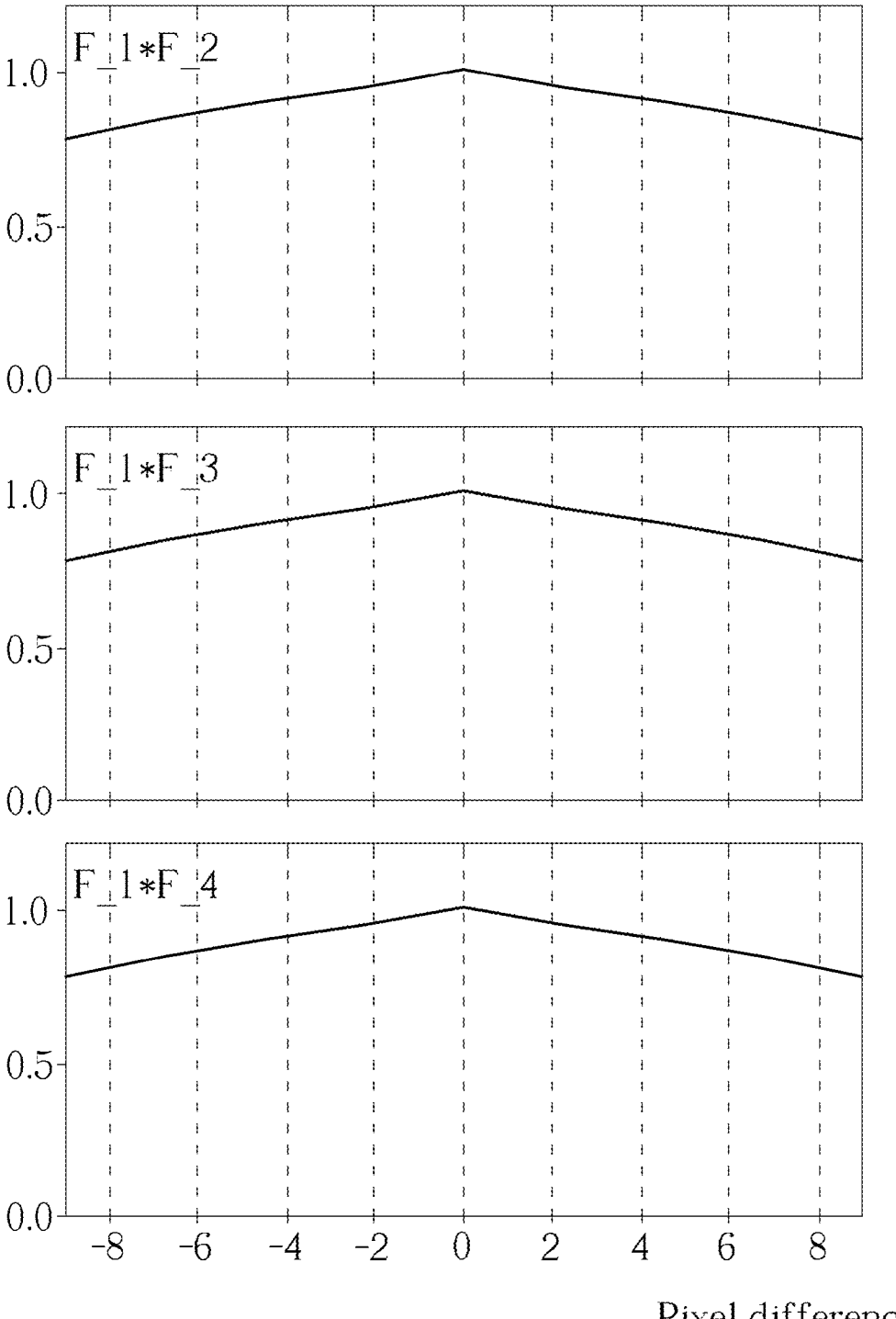
FIG. 4 is a diagram of the result of a conventional method for directly performing a cross-correlation upon pair of image frames without using the provided image bandpass filter operation and the spatial image filter operation.

FIG. 4 is a diagram of the result of a conventional method for directly performing a cross-correlation upon pair of image frames without using the provided image bandpass filter operation and the spatial image filter operation. As shown in FIG. 4, the vertical axis shows the values of the three cross-correlation results for the different pair of image frames F_1*F_2, F_1*F_3, F_1*F_4, and the horizontal axis shows the values of pixel difference. The peak values of the three cross-correlation results F_1*F_2, F_1*F_3, F_1*F_4 all correspond to zero pixel difference, and this indicates that the conventional method detects no relative motions which is be incorrect since the image frames F_1-F_4 actually have a motion with strong image features.

That is, even though the image frames F_1-F_4 actually have the strong image features, the conventional method cannot correctly detects the motion. This is also similar to the image frames F_5-F_8 actually having the weak image features, and the conventional method still cannot correctly detect the motion in the image frames F_5-F_8.

Figure 5:
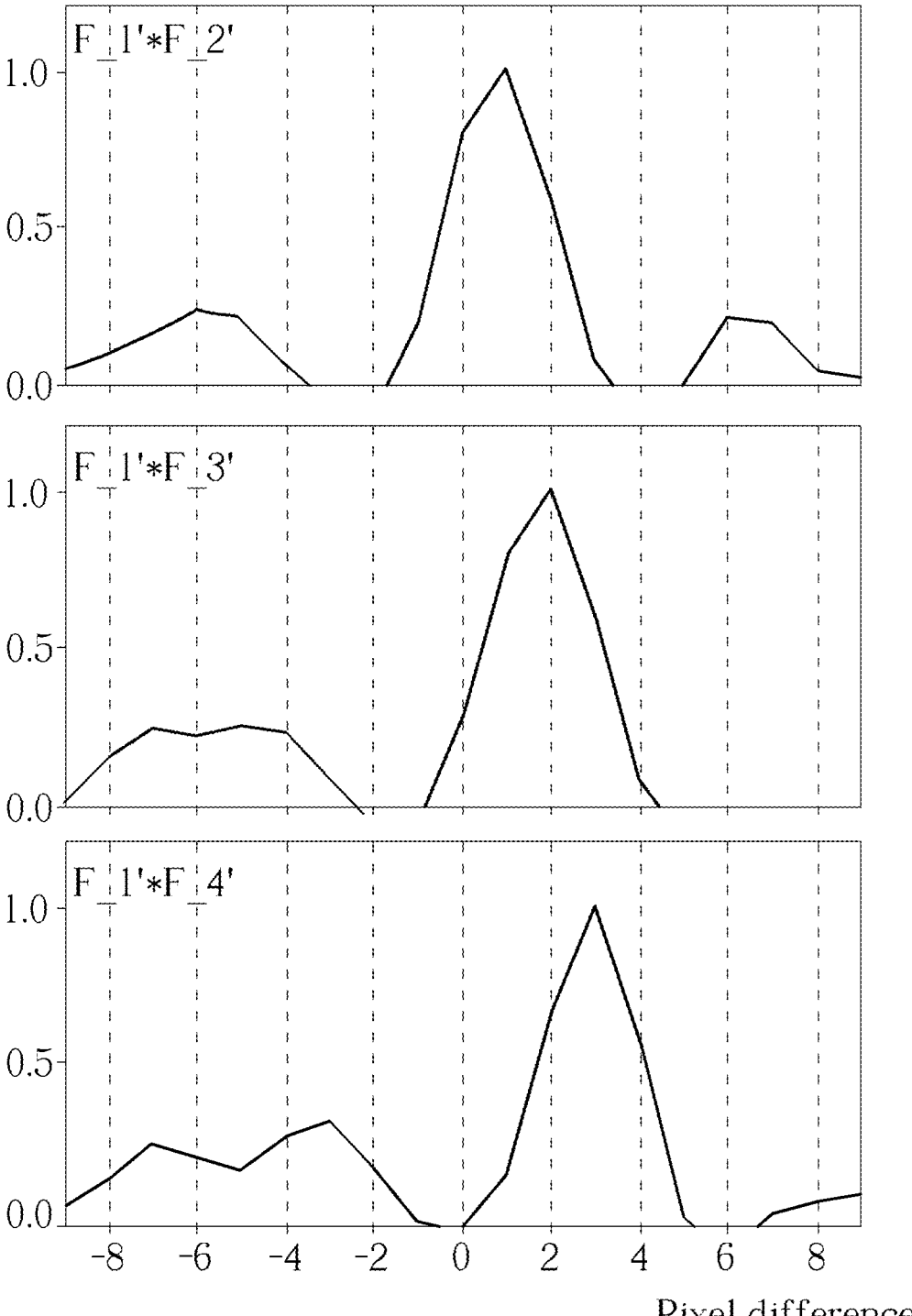
FIG. 5 is a diagram of the result of performing a cross-correlation upon pair of image frames having strong image features which have been processed by the spatial image filter operation but without being processed by the provided image bandpass filter operation.
Figure 6:
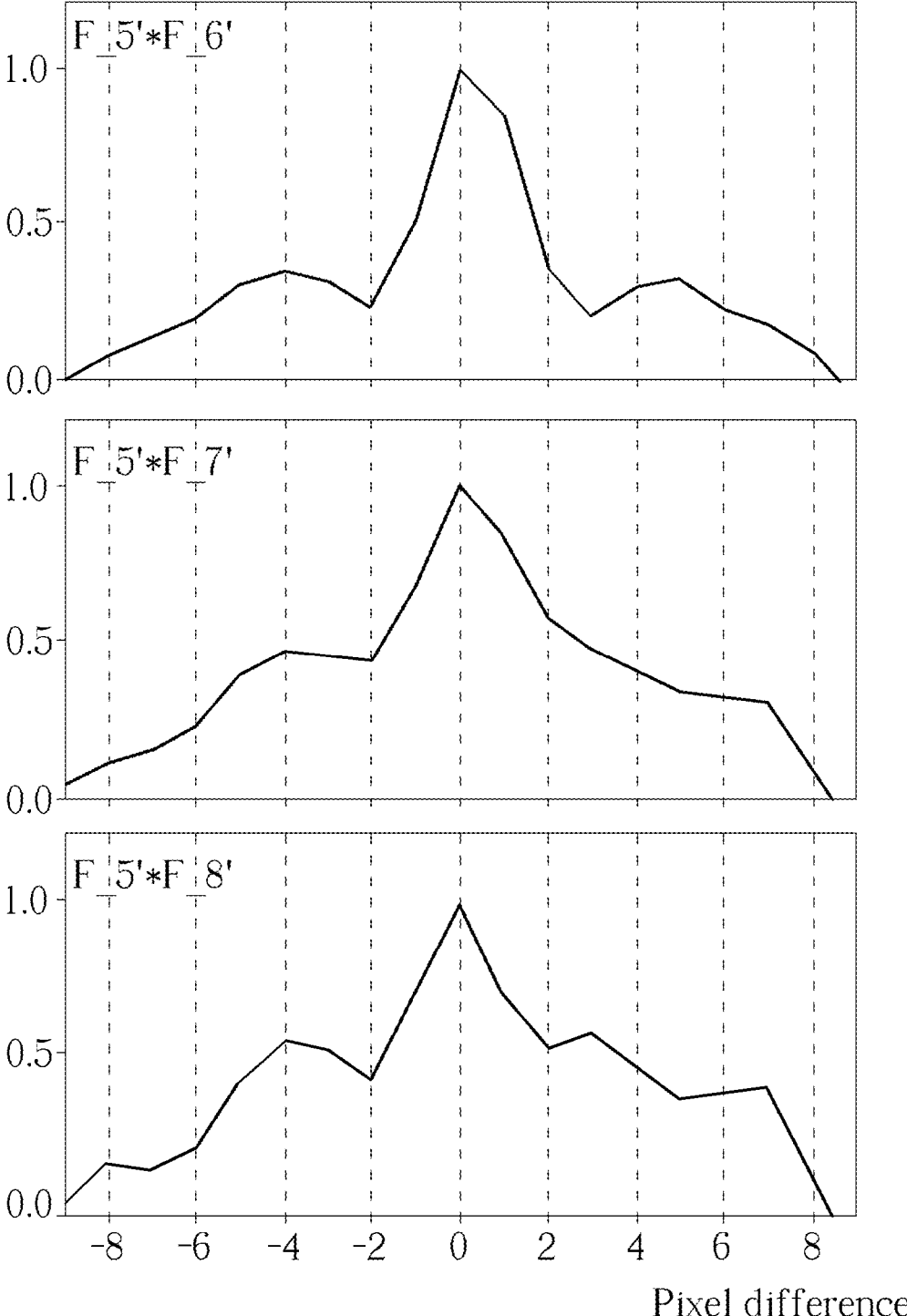
FIG. 6 is a diagram of the result of performing a cross-correlation upon pair of image frames having weak image features which have been processed by the spatial image filter operation but without being processed by the provided image bandpass filter operation.

Refer to FIG. 5 in conjunction with FIG. 6. FIG. 5 is a diagram of the result of performing a cross-correlation upon pair of image frames having strong image features which have been processed by the spatial image filter operation but without being processed by the provided image bandpass filter operation. FIG. 6 is a diagram of the result of performing a cross-correlation upon pair of image frames having weak image features which have been processed by the spatial image filter operation but without being processed by the provided image bandpass filter operation. F_1'-F_4' respectively indicate the four spatial-filtered image frames which are sequentially generated from the spatial image filter 107 based on the above-mentioned raw image frames F_1, F_2, F_3, and F_4, and F_5'-F_8' respectively indicate the four spatial-filtered image frames which are sequentially generated from the spatial image filter 107 based on the above-mentioned raw image frames F_5, F_6, F_7, and F_8. As shown in FIG. 5, the vertical axis shows the values of the three cross-correlation results for the different pair of spatial-filtered image frames, F_1' *F_2', F_1'*F_3', F_1' *F_4', and the horizontal axis shows the values of pixel difference. The peak values of the three cross-correlation results F_1'*F_2', F_1'*F_3', F_1'*F_4' respectively correspond to different pixel differences of one, two, and three. This indicates that the above method can correctly detect a motion which is identical to the motion actually occurring in the image frames F_1-F_4 with strong image features. However, as shown in FIG. 6, the peak values of the three cross-correlation results F_5'*F_6', F_5'*F_7', F_5'*F_8' all respectively correspond to zero pixel difference, and this indicates that the above method detects no motions. That is, the above method cannot correctly detect a motion actually occurring in the image frames F_5-F_8 having weak image features.

Figure 7:
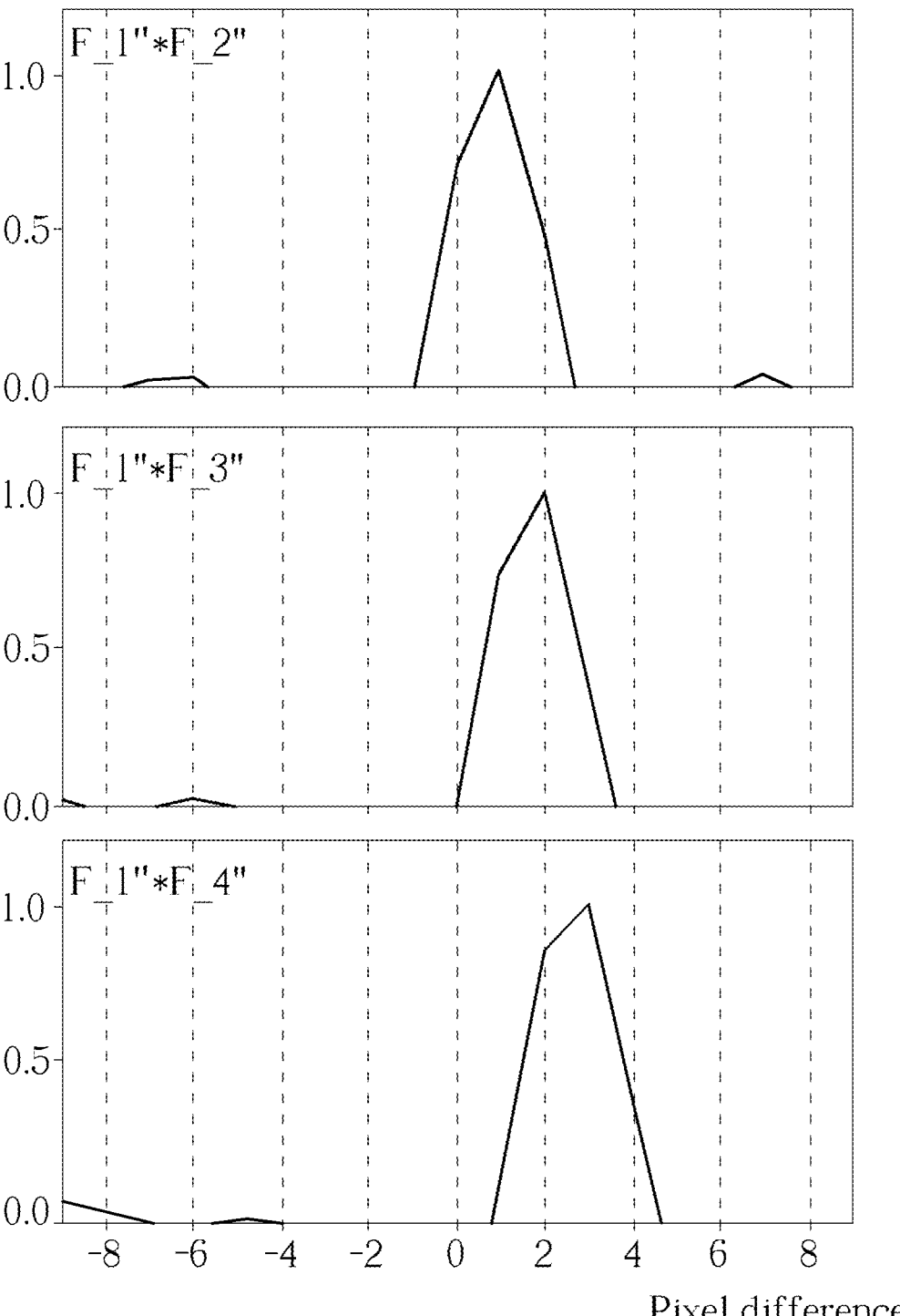
FIG. 7 is a diagram of the result of performing a cross-correlation upon pair of image frames having strong image features which have been processed by the spatial image filter operation and processed by the provided image bandpass filter operation.
Figure 8:
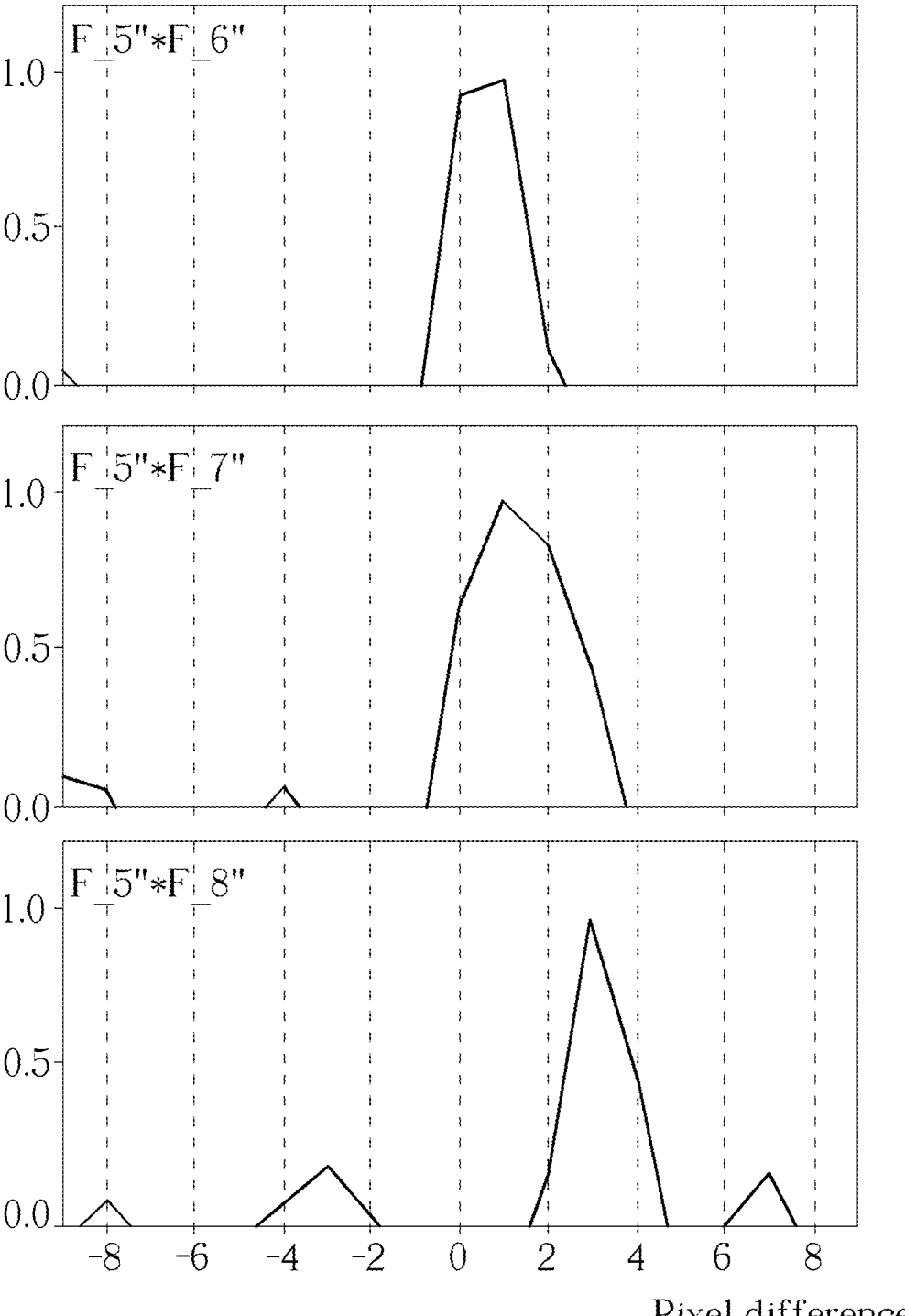
FIG. 8 is a diagram of the result of performing a cross-correlation upon pair of image frames having weak image features which have been processed by the spatial image filter operation and processed by the provided image bandpass filter operation.

Refer to FIG. 7 in conjunction with FIG. 8. FIG. 7 is a diagram of the result of performing a cross-correlation upon pair of image frames having strong image features which have been processed by the spatial image filter operation and processed by the provided image bandpass filter operation. FIG. 8 is a diagram of the result of performing a cross-correlation upon pair of image frames having weak image features which have been processed by the spatial image filter operation and processed by the provided image bandpass filter operation. F_1"-F_4" respectively indicate the four bandpass-filtered image frames which are generated through at least the image bandpass filter circuit 110 and/or the spatial image filter 107 based on the above-mentioned raw image frames F_1, F_2, F_3, and F_4, and F_5"-F_8" respectively indicate the four bandpass-filtered image frames which are generated through at least the image bandpass filter circuit 110 and/or the spatial image filter 107 based on the above-mentioned raw image frames F_5, F_6, F_7, and F_8. As shown in FIG. 7, the vertical axis shows the values of the three cross-correlation results for the different pair of image frames, F_1"*F_2", F_1"*F_3", F_1"*F_4", and the horizontal axis shows the values of pixel difference. The peak values of the three cross-correlation results F_1"*F_2", F_1"*F_3", F_1"*F_4" respectively correspond to different pixel differences of one, two, and three. This indicates that the provided method can correctly detect a motion which is identical to the motion actually occurring in the image frames F_1-F_4 having strong image features. Similarly, as shown in FIG. 8, the peak values of the three cross-correlation results F_5"*F_6", F_5"*F_7", F_5"*F_8" respectively correspond to the pixel differences of one, one, and three, and this indicates that the provided method based on the provided image bandpass filter operation still can accurately detect a motion even though the image frames F_5-F_8 have weak image features which may be overwhelmed by the fixed pattern noise.

In addition, the first average factor $k_u$ and the second average factor $k_v$ are programmable by the user. In another example, first average factor $k_u$ and the second average factor $k_v$ can be adapted depending on the acceleration and velocity of the optical navigation device 100/200 and/or the different types of surface features which the optical navigation device 100/200 may be placed on.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation device, to be coupled to a host device, comprising:
   a pixel array circuit, for capturing and generating an image frame;
   an image bandpass filter circuit, coupled to the pixel array circuit, for performing a bandpass filter operation upon the image frame to remove a low-frequency image noise and a high-frequency image noise from the image frame so as to generate a bandpass-filtered image frame; and
   a correlation circuit, coupled to the image bandpass filter circuit, for performing a correlation operation upon the bandpass-filtered image frame and a reference image frame to generate a displacement result between the bandpass-filtered image frame and the reference image frame as a motion result of the optical navigation device; the displacement result is to be reported to the host device if the displacement result indicates a motion;
   wherein the image bandpass filter circuit comprises:
      a first exponential average filter, for performing a first exponential average operation upon the image frame by using a first average factor to generate a first exponential-average output;
      a second exponential average filter, for performing a second exponential average operation upon the image frame by using a second average factor which is smaller than the first average factor to generate a second exponential-average output; and
      a difference circuit, coupled to the first exponential average filter and the second exponential average filter, for subtracting the second exponential-average output from the first exponential-average output to generate a difference output image as the bandpass-filtered image frame which is to be outputted to the correlation circuit.

2. The optical navigation device of claim 1, wherein the first exponential-average output and the second exponential-average output are generated based on two following equations:

$$U_t(x) = k_u \times P_t(x) + (1 - k_u) \times U_{t-1}(x); \text{ and}$$

$$V_t(x) = k_v \times P_t(x)_t + (1 - k_v) \times V_{t-1}(x);$$

wherein $k_u$ is the first average factor ranging from zero to 1; $k_v$ is the second average factor ranging from zero to 1 and smaller than the first average factor; $P_t(x)$ is a pixel value of a pixel unit x in the image frame at a time index t; $U_t(x)$ is the first exponential-average output corresponding to the pixel unit x in the image frame at the time index t; $U_{t-1}(x)$ is a previous first exponential-average output corresponding to the pixel unit x in a previous image frame at the time index t−1; $V_t(x)$ is the second exponential-average output corresponding to the pixel unit x in the image frame at the time index t; $V_{t-1}(x)$ is another second exponential-average output corresponding to the pixel unit x in the previous image frame at the time index t−1.

3. The optical navigation device of claim 2, wherein the difference output image is generated based a following equation:

$$D_t(x) = U_t(x) - V_t(x);$$

wherein $D_t(x)$ is a difference between the first exponential-average output $U_t(x)$ corresponding to the pixel unit x in the image frame at the time index t and the second exponential-average output $V_t(x)$ corresponding to the pixel unit x in the image frame at the time index t.

4. The optical navigation device of claim 1, wherein the correlation circuit is used to correlate the difference output image with the reference image frame to generate the displacement result, and the reference image frame is another difference image which is generated from the difference circuit and associated with a previous image frame captured by the pixel array circuit.

5. The optical navigation device of claim 1, further comprising:
   a spatial image filter, coupled between the pixel array circuit and the image bandpass filter circuit, for convolving a filter matrix with the image frame captured by the pixel array circuit to remove a local mean from the image frame and enhance an edge of the image frame to generate a spatial-filtered image into the image bandpass filter circuit, so as to make the image bandpass filter circuit perform the bandpass filter operation upon the spatial-filtered image frame.

6. The optical navigation device of claim 5, wherein the image bandpass filter circuit comprises:
   a first exponential average filter, for performing a first exponential average operation upon the spatial-filtered image frame by using a first average factor to generate a first exponential-average output;
   a second exponential average filter, for performing a second exponential average operation upon the spatial-filtered image frame by using a second average factor which is smaller than the first average factor to generate a second exponential-average output; and
   a difference circuit, coupled to the first exponential average filter and the second exponential average filter, for subtracting the second exponential-average output from the first exponential-average output to generate a difference output image as the bandpass-filtered image frame which is to be outputted to the correlation circuit.

7. The optical navigation device of claim 6, wherein the first exponential-average output and the second exponential-average output are generated based on two following equations:

$$U_t(x) = k_u \times F_t(x) + (1 - k_u) \times U_{t-1}(x); \text{ and}$$

$$V_t(x) = k_v \times F_t(x)_t + (1 - k_v) \times V_{t-1}(x);$$

wherein $k_u$ is the first average factor ranging from zero to 1; $k_v$ is the second average factor ranging from zero to 1 and smaller than the first average factor; $F_t(x)$ is a pixel value of a pixel unit x in the spatial-filtered image frame at a time index t; $U_t(x)$ is the first exponential-average output corresponding to the pixel unit x in the spatial-filtered image frame at the time index t; $U_{t-1}(x)$ is a previous first exponential-average output corresponding to the pixel unit x in a previous spatial-filtered image frame at the time index t−1; $V_t(x)$ is the second exponential-average output corresponding to the pixel unit x in the spatial-filtered image frame at the time index t; $V_{t-1}(x)$ is another second exponential-average output corresponding to the pixel unit x in the previous spatial-filtered image frame at the time index t−1.

8. The optical navigation device of claim 7, wherein the difference output image is generated based a following equation:

$$D_t(x) = U_t(x) - V_t(x);$$

wherein $D_t(x)$ is a difference between the first exponential-average output $U_t(x)$ corresponding to the pixel unit x in the spatial-filtered image frame at the time index t and the second exponential-average output $V_t(x)$ corresponding to the pixel unit x in the spatial-filtered image frame at the time index t.

9. The optical navigation device of claim 6, wherein the correlation circuit is used to correlate the difference output image with the reference image frame to generate the displacement result, and the reference image frame is another difference image which is generated from the difference circuit and associated with a previous spatial-filtered image frame generated by the spatial image filter.

10. A method of an optical navigation device to be coupled to a host device, comprising:

providing a pixel array circuit to capture and generate an image frame;

performing a bandpass filter operation upon the image frame to remove a low-frequency image noise and a high-frequency image noise from the image frame so as to generate a bandpass-filtered image frame; and performing a correlation operation upon the bandpass-filtered image frame and a reference image frame to generate a displacement result between the bandpass-filtered image frame and the reference image frame as a motion result of the optical navigation device;

wherein the displacement result is to be reported to the host device if the displacement result indicates a motion; and, the step of performing the bandpass filter operation comprises:

performing a first exponential average operation upon the image frame by using a first average factor to generate a first exponential-average output;

performing a second exponential average operation upon the image frame by using a second average factor which is smaller than the first average factor to generate a second exponential-average output; and subtracting the second exponential-average output from the first exponential-average output to generate a difference output image as the bandpass-filtered image frame which is to be outputted to the correlation circuit.

11. The method of claim 10, wherein the first exponential-average output and the second exponential-average output are generated based on two following equations:

$$U_t(x) = k_u \times P_t(x) + (1 - k_u) \times U_{t-1}(x); \text{ and}$$

$$V_t(x) = k_v \times P_t(x)_t + (1 - k_v) \times V_{t-1}(x);$$

wherein $k_u$ is the first average factor ranging from zero to 1; $k_v$ is the second average factor ranging from zero to 1 and smaller than the first average factor; $P_t(x)$ is a pixel value of a pixel unit x in the image frame at a time index t; $U_t(x)$ is the first exponential-average output corresponding to the pixel unit x in the image frame at the time index t; $U_{t-1}(x)$ is a previous first exponential-average output corresponding to the pixel unit x in a previous image frame at the time index t−1; $V_t(x)$ is the second exponential-average output corresponding to the pixel unit x in the image frame at the time index t; $V_{t-1}(x)$ is another second exponential-average output corresponding to the pixel unit x in the previous image frame at the time index t−1.

12. The method of claim 11, wherein the difference output image is generated based a following equation:

$$D_t(x) = U_t(x) - V_t(x);$$

wherein $D_t(x)$ is a difference between the first exponential-average output $U_t(x)$ corresponding to the pixel unit x in the image frame at the time index t and the second exponential-average output $V_t(x)$ corresponding to the pixel unit x in the image frame at the time index t.

13. The method of claim 10, further comprising:

correlating the difference output image with the reference image frame to generate the displacement result;

wherein the reference image frame is another difference image which is generated from the step of subtracting the second exponential-average output from the first exponential-average output and associated with a previous image frame captured by the pixel array circuit.

14. The method of claim 10, further comprising:

convolving a filter matrix with the image frame captured by the pixel array circuit to remove a local mean from the image frame and enhance an edge of the image frame to generate a spatial-filtered image into the image bandpass filter circuit, so as to perform the bandpass filter operation upon the spatial-filtered image frame.

15. The method of claim 14, wherein the step of performing the bandpass filter operation comprises:

performing a first exponential average operation upon the spatial-filtered image frame by using a first average factor to generate a first exponential-average output;

performing a second exponential average operation upon the spatial-filtered image frame by using a second average factor which is smaller than the first average factor to generate a second exponential-average output; and subtracting the second exponential-average output from the first exponential-average output to generate a difference output image as the bandpass-filtered image frame which is to be outputted and correlated.

16. The method of claim 15, wherein the first exponential-average output and the second exponential-average output are generated based on two following equations:

$$U_t(x) = k_u \times F_t(x) + (1 - k_u) \times U_{t-1}(x); \text{ and}$$

$$V_t(x) = k_v \times F_t(x)_t + (1 - k_v) \times V_{t-1}(x);$$

wherein $k_u$ is the first average factor ranging from zero to 1; $k_v$ is the second average factor ranging from zero to 1 and smaller than the first average factor; $F_t(x)$ is a pixel value of a pixel unit x in the spatial-filtered image frame at a time index t; $U_t(x)$ is the first exponential-average output corresponding to the pixel unit x in the spatial-filtered image frame at the time index t; $U_{t-1}(x)$ is a previous first exponential-average output corresponding to the pixel unit x in a previous spatial-filtered image frame at the time index t−1; $V_t(x)$ is the second exponential-average output corresponding to the pixel unit x in the spatial-filtered image frame at the time index t; $V_{t-1}(x)$ is another second exponential-average output corresponding to the pixel unit x in the previous spatial-filtered image frame at the time index t−1.

17. The method of claim 16, wherein the difference output image is generated based a following equation:

$$D_t(x) = U_t(x) - V_t(x);$$

wherein $D_t(x)$ is a difference between the first exponential-average output $U_t(x)$ corresponding to the pixel unit x in the spatial-filtered image frame at the time index t and the second exponential-average output $V_t(x)$ corresponding to the pixel unit x in the spatial-filtered image frame at the time index t.

18. The method of claim 15, further comprising:

correlating the difference output image with the reference image frame to generate the displacement result, and the reference image frame is another difference image which is generated from the step of subtracting the second exponential-average output from the first exponential-average output and associated with a previous spatial-filtered image frame.

* * * * *